United States Patent [19]

Satoh

[11] Patent Number: 5,323,383
[45] Date of Patent: Jun. 21, 1994

[54] CONTROL INFORMATION TRANSMISSION APPARATUS FOR USE IN TIME DIVISION MULTIPLEX COMMUNICATION SYSTEMS

[75] Inventor: Kougi Satoh, Hyogo, Japan

[73] Assignee: Mitsubishi Denki Kabushiki Kaisha, Tokyo, Japan

[21] Appl. No.: 964,069

[22] Filed: Oct. 21, 1992

[30] Foreign Application Priority Data

Dec. 16, 1991 [JP] Japan ................................. 3-351754

[51] Int. Cl.[5] ............................................. H04J 3/12
[52] U.S. Cl. ..................................... 370/15; 370/85.7; 370/110.1
[58] Field of Search ................. 370/15, 16, 85.7, 95.1, 370/110.1, 111

[56] References Cited

U.S. PATENT DOCUMENTS 4,402,082  8/1983  Cope ..................................... 370/16
5,214,649  5/1993  As et al. ............................. 370/85.7

FOREIGN PATENT DOCUMENTS 58-34634  3/1983  Japan.

Primary Examiner—Benedict V. Safourek
Attorney, Agent, or Firm—Rothwell, Figg, Ernst & Kurz

[57] ABSTRACT

A control information transmission apparatus for use in time division multiplex communication systems for allocating the control information necessary for transmitting the data to a part of the user area between the communication equipments connected to the time division multiplex highway includes a control information transmission area variable setting apparatus for selectively allocating the time assigned to control information data in every time-slot in order to variably separate the time assigned to control information data transmission area from the time assigned to the user data area so that the control information data are transmitted at selected speeds.

3 Claims, 4 Drawing Sheets

CONTROL INFORMATION TRANSMISSION APPARATUS FOR USE IN TIME DIVISION MULTIPLEX COMMUNICATION SYSTEMS

BACKGROUND OF THE INVENTION

The invention relates to a control information transmission apparatus for transmitting control information required for data transmission in time division multiplex communication systems.

An apparatus which transmits such control information efficiently is disclosed in the prior art Japanese laid-open patent publication No. 58-34634.

FIG. 7 is a block diagram of the conventional control information insertion and extraction circuit used in such time division multiplex communication systems. In FIG. 7, 51 is a central processing unit (CPU) for controlling the control information transmission apparatus. 52 is a serial interface for transmitting the control information. 53 is an inserting portion for inserting the transmitting control information. 54 is a sending side data transmission line for transmitting the data. 55 is a receiving side data transmission line for receiving the data. 56 is an extracting portion for extracting the received control information. 57 is a serial interface for receiving the control information.

The operation of the conventional control information transmission apparatus is explained hereinafter. The CPU 51 controls the transmitting and received control information. The transmitting control information is outputted from the CPU 51 to the sending side data transmission line 54 through the serial interface 52 and the inserting portion 53. The control information received from the receiving side data transmission line 55 is extracted by the extracting portion 56 and outputted to the CPU 51 through the serial interface 57.

FIG. 8 shows a frame format construction of the Y interface primary group. The transmitting and receiving control information are allocated to the fixed time-slot which is called service channel. 58 is a frame having 24 channels. 59 is the head channel (CH 1) of the frame. 60 is the frame construction of CH 1 having 8 bits in the channel.

61 is a fixed time-slot in which a service channel is allocated in each channel 59 of the frame 58. CPU 51 extracts the control information from the fixed channel in the data signal received from the receiving side data transmission line 55, or inserts the control signal to be transmitted into the service channel and transmits it to the sending side data transmission line 54.

Since the conventional control information insertion and extraction circuit is constructed as described above in the time division multiplex communication systems, there are problems caused by the fact that the transmission rate of the transmitting or receiving control information is fixed. Also, since the time-slot where the control information is inserted is restricted, it is difficult to transmit a lot of control information during a short time.

Therefore, since the conventional system allocates the fixed channel for transmitting the control information, if a system requires the transmission of a lot of control information during a short time, the user area decreases and the system transmission efficiency also decreases.

It is a primary object of the present invention to provide a control information transmission apparatus for use in time division multiplex communication systems for transmitting a lot of control information at a high speed during a short time, and for realizing a high efficiency transmission by decreasing loss of the main data transmitted by the user area of the frame channel.

It is another object of the present invention to provide a control information transmission apparatus for use in time division multiplex communication systems for transmitting a lot of remote loop back information or route changing system data at a high speed during a short time, and for realizing a high efficiency transmission by decreasing loss of the main data transmitted by the user area of the frame channel and also for changing the route at a high speed in order to respond to a system fault.

SUMMARY OF THE INVENTION

A control information transmission apparatus of a first embodiment of the present invention for use in time division multiplex communication systems for allocating the control information necessary for transmitting the data to a part of the user area between the communication equipments connected by the time division multiplex highway comprises a control information transmission area variable setting means for selectively allocating control information in any time slot in order to variably separate the control information transmission area and the user area so that the data are transmitted at selected speeds.

In the control information transmission apparatus of a second embodiment of the present invention for use in time division multiplex communication systems, the control information transmission area corresponds to a test function setting transmission area in which the remote loop back information is allocated or a system switching transmission area in which the system data is allocated for changing the routing.

DETAILED DESCRIPTION OF THE PREFERRED EMBODIMENTS

First Embodiment

The first embodiment of the present invention is explained hereinafter using FIG. 1.

Figure 1:
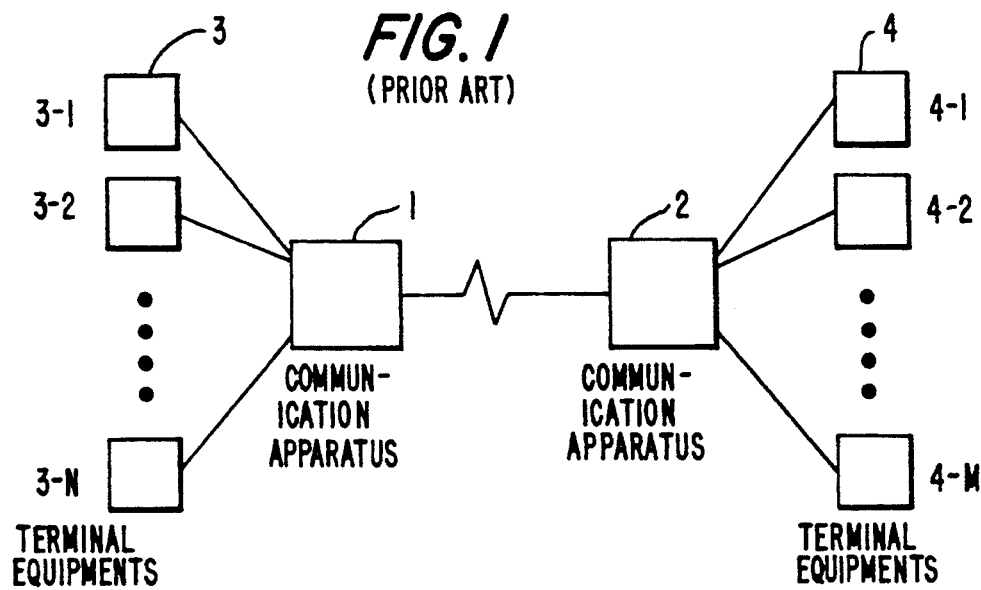
FIG. 1 shows a communication network embodying the present invention and connected to the time division multiplex highway of a Y interface primary group.
Figure 2:
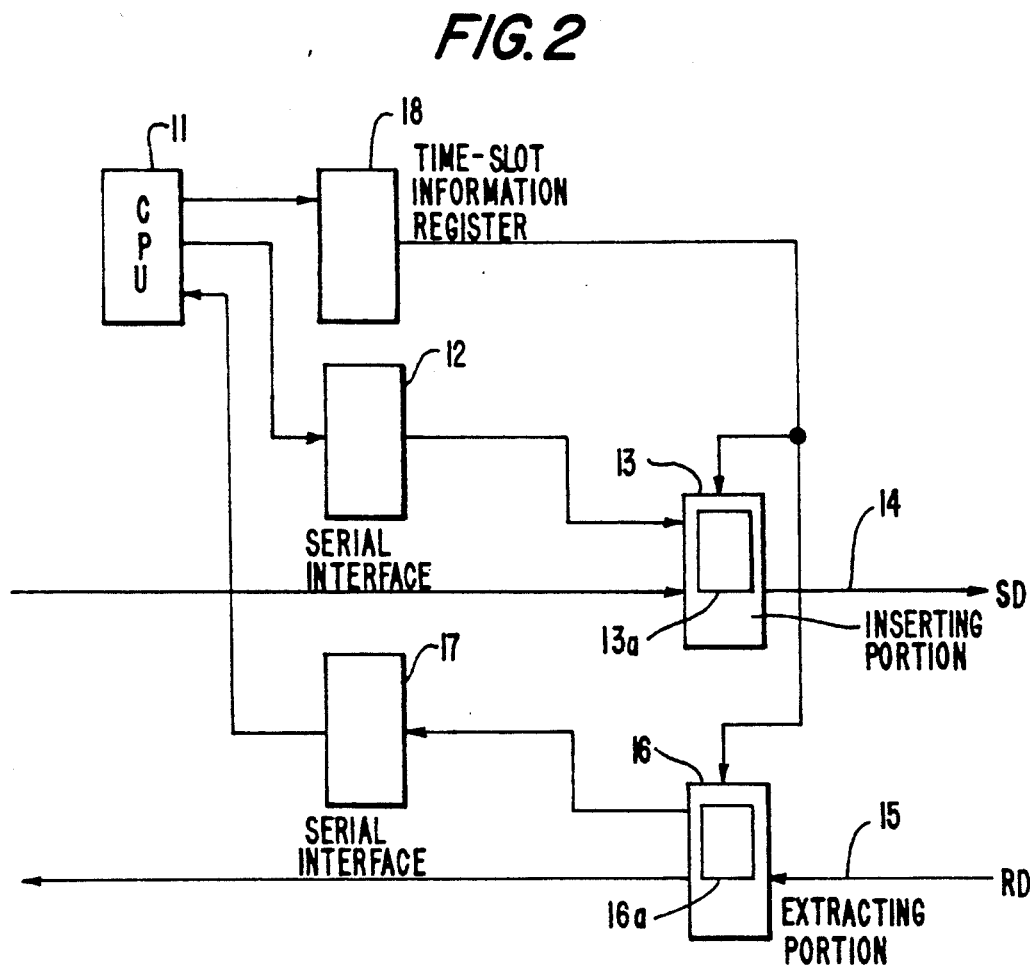
FIG. 2 is block diagram of a control information insertion and extraction circuit embodying the present invention for realizing the control information transmission apparatus as used in time division multiplex communication systems.

FIG. 1 shows a communication network embodying the present invention and connected to the time division multiplex highway of a Y interface primary group. In FIG. 1, 1 and 2 are communication apparatus connected to the time division multiplex highway of the Y interface primary group. 3 represents N terminal equipments connected to the communication apparatus 1. 4 represents M terminal equipments connected to the communication apparatus 2.

FIG. 2 is block diagram of a control information insertion and extraction circuit used in the communication apparatus 1 and communication apparatus 2 for realizing the control information transmission apparatus of the present invention for time division multiplex communication systems.

In FIG. 2, 11 is a CPU for controlling the control information insertion and extraction circuit. 12 is a serial interface for transmitting the control information. 13 is an inserting portion for inserting the transmitting control information. 14 is a sending side data transmission line for transmitting the data. 17 is a serial interface for receiving the control information. 18 is a time-slot information register.

The inserting portion 13 comprises a time-slot counter 13a for counting time-slots for 24 channels from 1 to 192 by the means of a frame synchronous signal. The time-slot counter 13a outputs the counted values as time-slot address information.

The inserting portion 13 reads out the contents written in the time-slot information register 18 by the time-slot address information. Then, the inserting portion 13 outputs the transmitting control information received from the CPU 11 through the serial interface 12 to the sending side data transmission line 14 in response to the read out contents of the time-slot information register 18.

15 is a receiving side data transmission line for receiving the data. 16 is an extracting portion for extracting the received control information. The extracting portion 16 comprises a time-slot counter 16a for counting time-slots for 24 channels from 1 to 192 by means of a the frame synchronous signal. The time-slot counter 16a outputs the counted values as time-slot address information.

The extracting portion 16 reads out the content written in the time-slot information register 18 by the time-slot address information. Then, extracting portion 16 extracts the receiving control information from the main data on the receiving side data transmission line 15 in response to the read out contents of the time-slot information register 18. The receiving control information extracted by the extracting portion 16 is outputted to the CPU 11 through the serial interface 17.

Identification data which identify the control data or the main data is written into the time-slot information register 18 corresponding to the time-slot address information outputted from the time-slot counter 13a or the time-slot counter 16a. This identification data is written into the time-slot information register 18 in advance by the CPU 11.

As described above, the control information transmission apparatus comprises the CPU 11, the time-slot counter 13a, the time-slot counter 16a, the serial interface 12, the inserting portion 13, the sending side data transmission line 14, the receiving side data transmission line 15, the extracting portion 16, the serial interface 17, and the time-slot information register 18.

Figure 3:
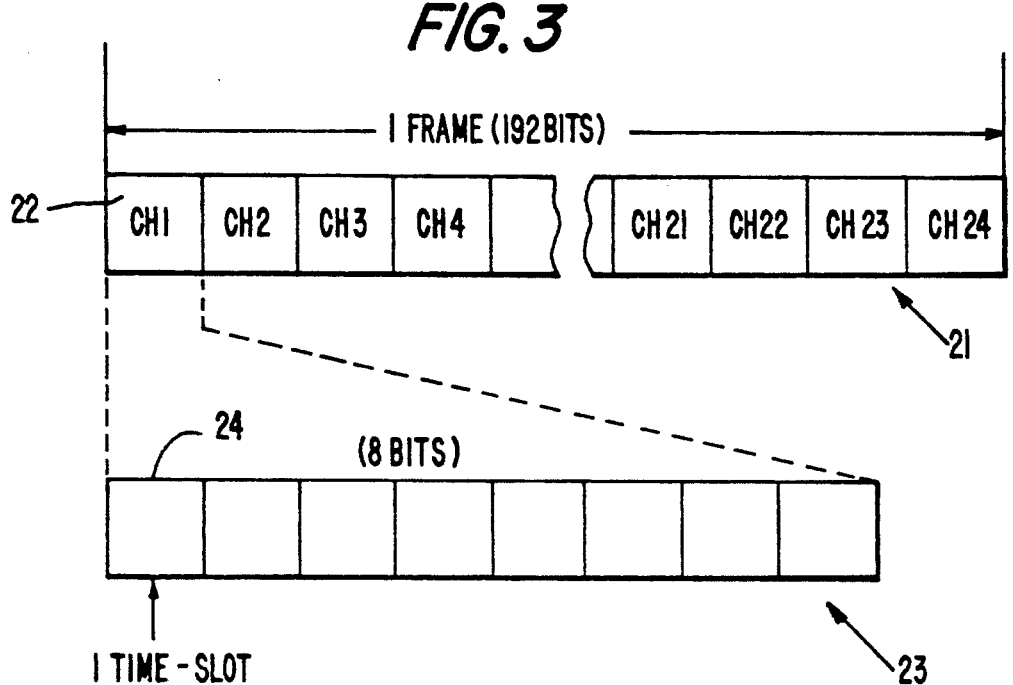
FIG. 3 shows a frame format of the Y interface primary group of the control information transmission apparatus of the present invention as used in time division multiplex communication systems.

FIG. 3 shows the frame format of the Y interface primary group of the control information transmission apparatus of the first embodiment of the present invention as used in the time division multiplex communication systems. 21 is a frame constructed of 24 channels. 22 is the head channel (CH 1) of the frame. 23 is the frame construction of CH 1 having 8 bits in the channel.

The operation of the first embodiment of the present invention is explained below, where the terminal equipment 3-1 is communicating with the terminal equipment 4-1, and when the terminal 3-1 is then requested to communicate with the terminal equipment 4-2.

The communication equipment 1 and the communication equipment 2 set service channel in an unused channel of the user area. That is, each time-slot of the respective channel is selected for setting a control information area or a user area. This setting is executed by the CPU 11.

As a result, the service channel transmission area and the user channel transmission area are newly set for every time-slot in the frame. The control information (the information for changing the multiplex format) is transmitted at a high speed using the service channel transmission area. The CPU in the communication equipment 1 and the CPU in the communication equipment 2 change the multiplex format.

When the high speed transmission of the control information using the newly set service channel transmission area has finished, the setting of the service channel transmission area and the user channel transmission area is released and returns to the former low speed service channel.

As describe above, since the service channel is set in any time-slots, the control information can be transmitted at a high speed so that the user transmitting area may not be lost. Accordingly, the dynamic routing is executed at a high speed in the first embodiment.

Second embodiment

A second embodiment of the present invention is explained hereinafter. The communication equipment and the control information insertion and extraction circuit of the second embodiment are the same as those of the first embodiment of FIG. 2.

Figure 4:
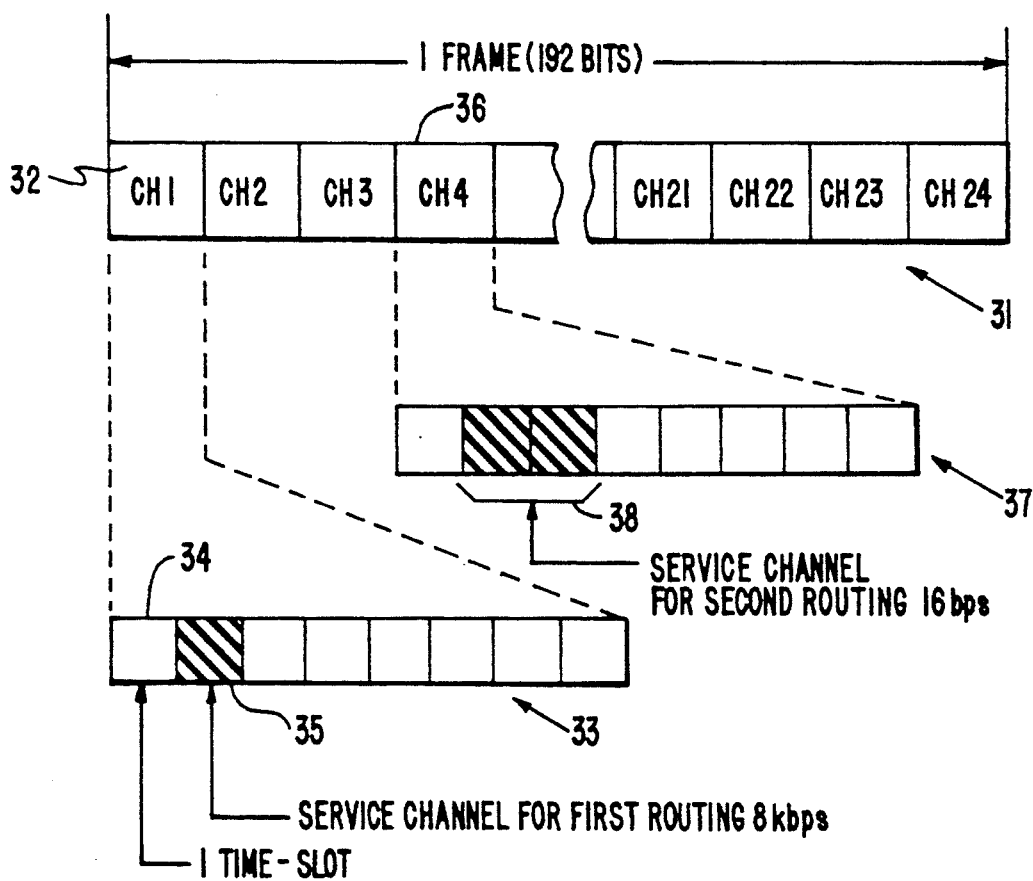
FIG. 4 shows a format construction in which the service channels are set in each channel corresponding to respective routing in accordance with the present invention.

FIG. 4 shows a format construction in which the service channels are set to each channel corresponding to respective routing in the second embodiment of the present invention.

In FIG. 4, 31 is a frame construction having 192 bits. 32 shows the head channel CH 1 corresponding to the first routing. 33 shows a channel construction of the channel CH 1 having 8 bits. 34 is a time-slot in the channel CH 1. 35 is a service channel corresponding to the first routing having 8 kbps transmission capacity. 36 is a fourth channel CH 4 corresponding to the second routing. 38 shows a channel construction of the channel CH 4. 38 is a service channel corresponding to the second routing having 16 kbps transmission rate.

Since every time-slot can be set as a service channel transmission area, the service channel can be set without using hardware switch for the multiple access used in the primary group interface of ISDN.

Third embodiment

The third embodiment of the present invention is explained hereinafter.

Figure 5:
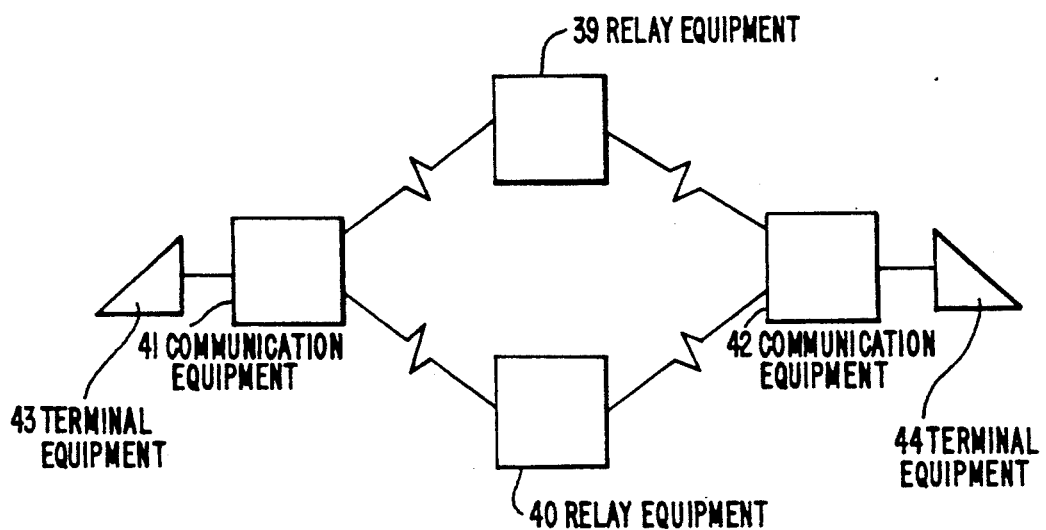
FIG. 5 shows a construction for another communication system embodying the present invention.

The setting of the service channel of the third embodiment is explained for the case where a fault occurs in the communication systems shown in FIG. 5.

FIG. 5 shows a construction of another communication system in which the third embodiment is applied. In FIG. 5, 39, 40 are relay equipments. 41, 42 are communication equipments. The communication equipment and the control information insertion and extraction circuit of the third embodiment are the same as those of the first embodiment of FIG. 2. 43 is a terminal equipment connected to the communication equipment 41. 44 a terminal equipment connected to the communication equipment 42.

Figure 6:
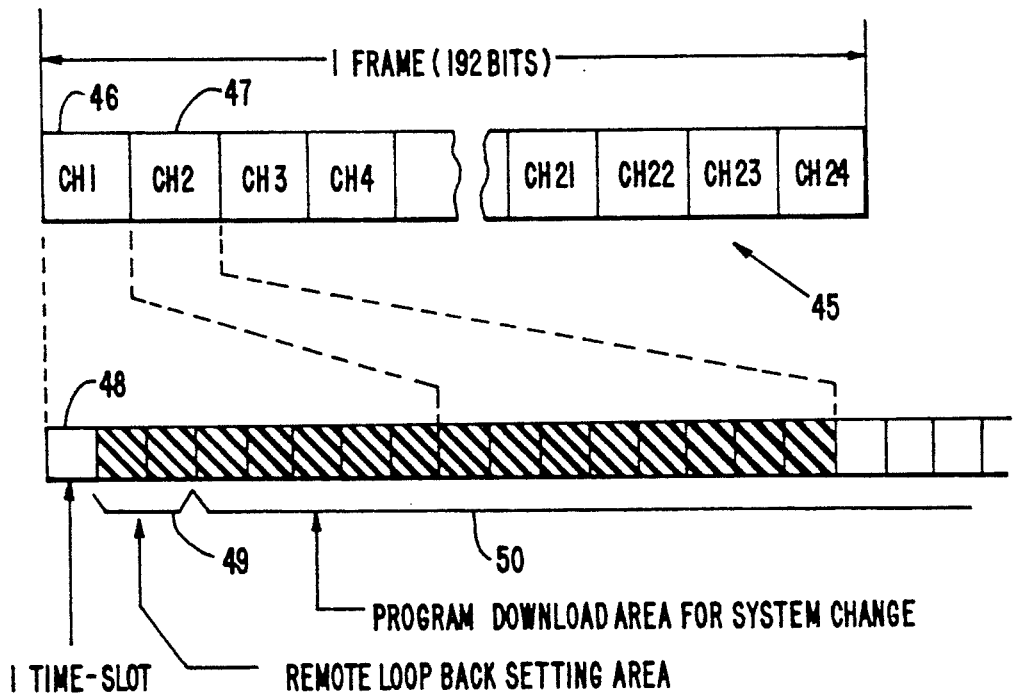
FIG. 6 show a format construction of the service channel construction which is set when the fault occurred in the communication systems.
Figure 7:
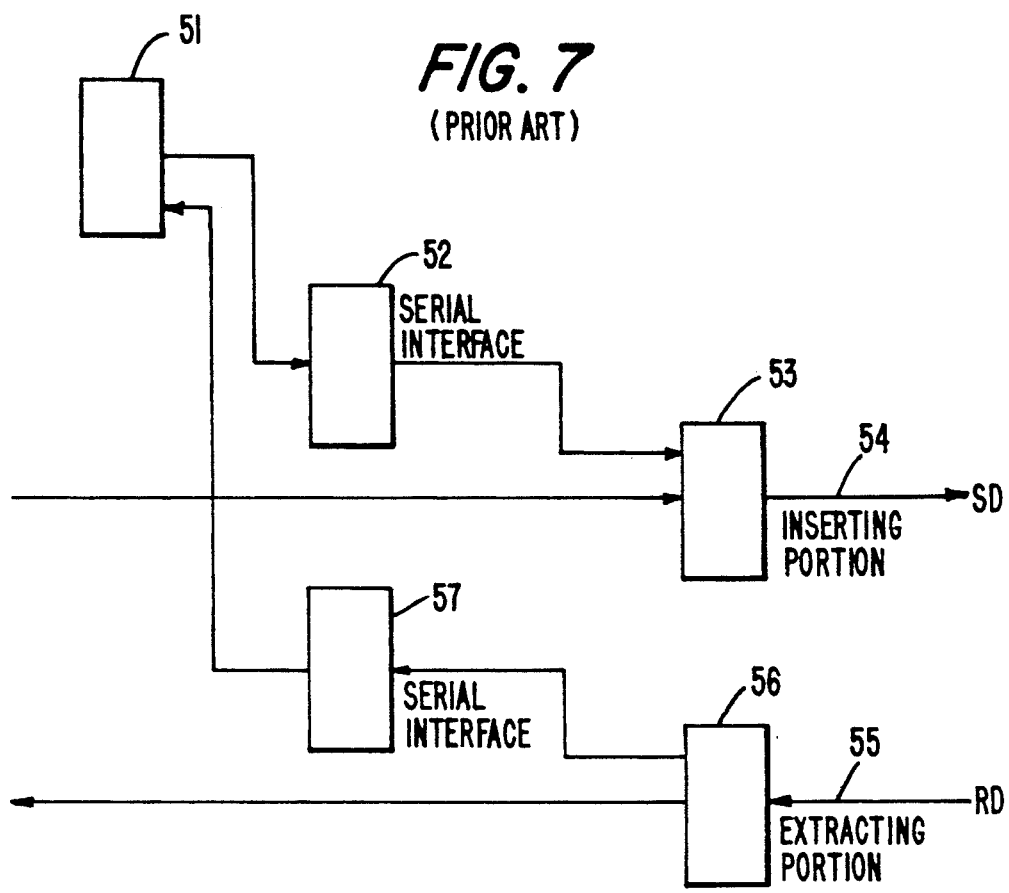
FIG. 7 is a block diagram of a conventional control information insertion and extraction circuit used in time division multiplex communication systems.
Figure 8:
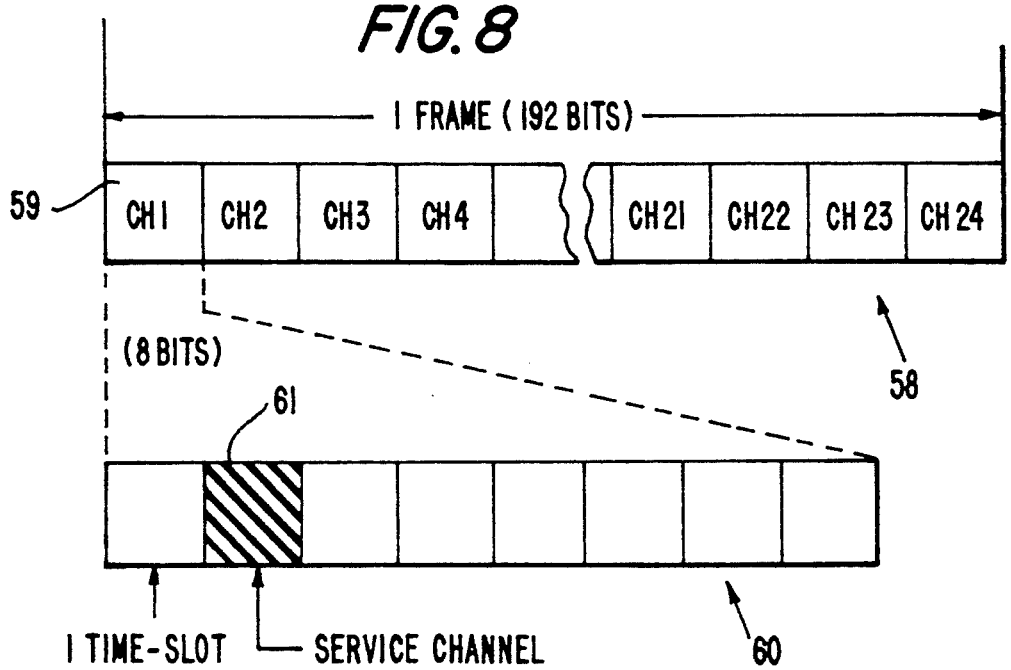
FIG. 8 shows a frame format construction of the Y interface primary group of the system of FIG. 7.

FIG. 6 shows the format construction of the service channel construction which is set when a fault occurs in the communication systems. In FIG. 6, 45 is a frame construction having 192 bits. 46 shows a head channel CH 1. 47 shows second channel CH 2. 48 is a time-slot in the channel CH 1. 49 is a remote loop back setting area. The remote loop back setting area 49 is used in order to send the test pattern from the communication equipment 41 or 42 to the relay equipment 39 and in order to execute the return test at the relay equipment 39, when the relay equipment 39 fails during the terminal equipment 43 and the terminal equipment 44 communicate through the communication equipment 41, the relay equipment 39 and the communication equipment 42.

50 is a program down load information transmission area in which the communication equipment 41 and 42 alternatively download the control information in order to make another route which bypasses the failed route. The remote back area or program download information transmission area is allocated for the time-slot in the channel.

In this case, the remote loop back setting area 49 and program download information transmission area 50 correspond to the service channel. The remote loop back setting area 49 and program download information transmission area 50 are set in many unused channels of the user area by the communication equipment 41 and the communication equipment 42. The program download information transmission area 50 is used for changing the route at a high speed in order to recover the fault system.

As described above, according to one of the embodiment, since the service channels for transmitting the continuous control information are set in any time-slot, the control information insertion and extraction circuit can transmit a lot of control information at a high speed during a short time. The control information also can be transmitted at high efficiency with a low loss of the user transmitting area. Accordingly, the dynamic routing is executed at a high speed in the first embodiment.

According to the other embodiments, since the remote loop back information or the system data for changing the routing are allocated in the control transmission area, the route changing is executed at a high speed in order to recover the fault system.

What is claimed is:

1. A control information transmission apparatus for use in time division multiplex communication systems, in which control information data and user data are transmitted in different time slots within sequential transmission time channels, for allocating the time slots assigned to control information data necessary for transmitting data in relation to the time slots assigned to user data transmitted between communication equipments connected to the time division multiplex highway, comprising:

inserting means for inserting in each of said sequential transmission time channels control information data in one or more selected time slots which are separate from the time slots containing user data; and variable setting means for variably controlling the number of said selected time slots in each such sequential time channel which are allocated to the insertion of control information data in relation to the remaining number of time slots in each such sequential time channel to variably control the rate of transmission of said control information data.

2. A control information transmission apparatus according to claim 1, wherein said control information data comprises test function setting transmission data in which the remote loop back information is allocated.

3. A control information transmission apparatus according to claim 1, wherein said control information data comprises system switching transmission data in which the system data is allocated in order to change the routing of the transmission line.

* * * * *